(12) United States Patent
Belmont

(10) Patent No.: US 7,766,779 B2
(45) Date of Patent: Aug. 3, 2010

(54) SWITCHING DEVICE FOR A MOTOR VEHICLE AND USE OF THIS DEVICE

(75) Inventor: Serge Belmont, Boulogne-Billancourt (FR)

(73) Assignee: Peugeot Citroen Automobiles SA, Velizy Villacoublay (FR)

( * ) Notice: Subject to any disclaimer, the term of this patent is extended or adjusted under 35 U.S.C. 154(b) by 546 days.

(21) Appl. No.: 11/718,813

(22) PCT Filed: Apr. 27, 2006

(86) PCT No.: PCT/FR2006/050393

§ 371 (c)(1),
(2), (4) Date: May 8, 2007

(87) PCT Pub. No.: WO2006/117493

PCT Pub. Date: Nov. 9, 2006

(65) Prior Publication Data

US 2008/0093190 A1  Apr. 24, 2008

(30) Foreign Application Priority Data

May 2, 2005 (FR) .................................. 05 51146

(51) Int. Cl.
*F16H 3/72* (2006.01)
*F16H 3/44* (2006.01)
*F16D 11/04* (2006.01)

(52) U.S. Cl. .................... 475/5; 475/302; 192/69.8
(58) Field of Classification Search .................... 475/5, 475/302, 303; 74/339, 340, 473.37; 180/65.21; 192/48.1, 66.1, 69.8

See application file for complete search history.

(56) References Cited

U.S. PATENT DOCUMENTS

| 4,019,586 | A | 4/1977 | Hauser et al. |
| 4,096,932 | A | 6/1978 | Liberty et al. |
| 4,449,416 | A * | 5/1984 | Huitema .................... 74/336 R |
| 5,765,671 | A | 6/1998 | Endo et al. |
| 6,478,705 | B1 | 11/2002 | Holmes et al. |
| 7,165,470 | B2 * | 1/2007 | Sakamoto et al. ............. 74/339 |
| 7,581,467 | B2 * | 9/2009 | Peterman et al. .......... 74/606 R |

(Continued)

FOREIGN PATENT DOCUMENTS

EP   0700805 A   3/1996

(Continued)

OTHER PUBLICATIONS

International Search Report mailed Oct. 4, 2006 in PCT/FR2006/050393.

*Primary Examiner*—Roger Pang
(74) *Attorney, Agent, or Firm*—Nicolas E. Seckel

(57) ABSTRACT

The invention relates to, in essence, a switching device (10, 11) for a motor vehicle. This switching device comprises two idler gears (17, 18) and a claw (14). This claw (14) assures, by displacement, a selective connection of a drive shaft (9) to one of the two idler gears (17, 18). According to the invention, the claw (14) comprises axial protrusions (65, 66) for simultaneously connecting it to the two idler gears (17, 18). To this end, the gears (17, 18) each have axial projections (67, 68). The protrusions (65, 66) are designed for entering the spaces made between the projections (67, 68). The inventive switching device (10, 11) is preferably used with a hybrid transmission device (1).

12 Claims, 6 Drawing Sheets

U.S. PATENT DOCUMENTS

Figure 1:
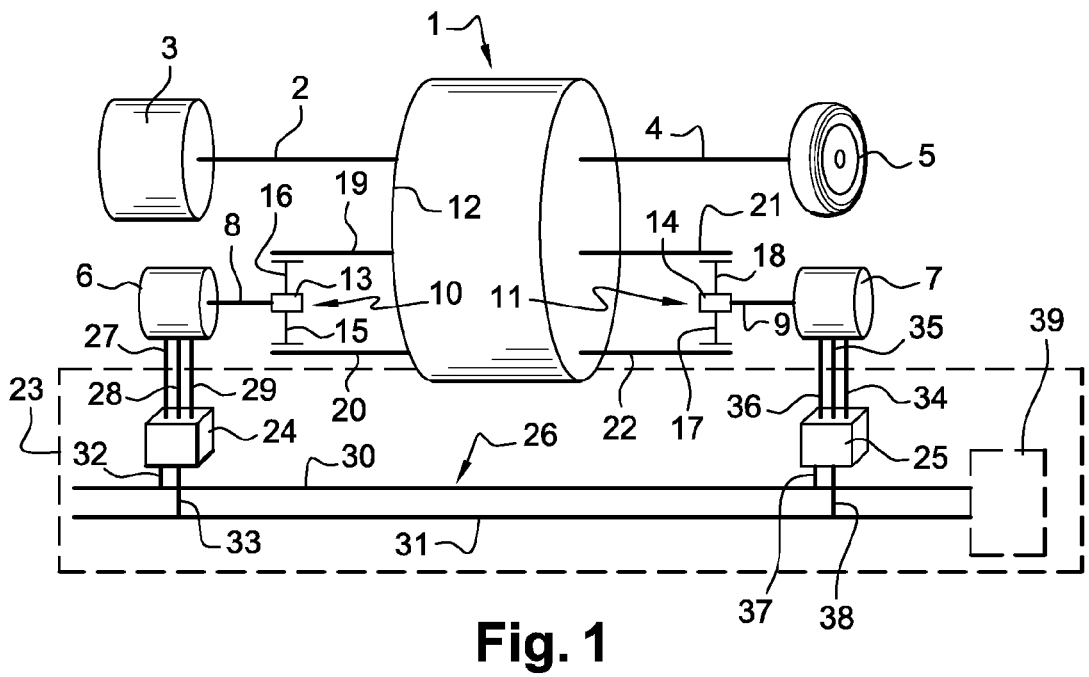

| | | |
|---|---|---|
| 2002/0098941 A1 | 7/2002 | Minowa et al. |
| 2005/0064974 A1 | 3/2005 | Bezian et al. |
| 2008/0009379 A1* | 1/2008 | Steinwender .................. 475/5 |
| 2008/0167782 A1* | 7/2008 | Belmont et al. ............... 701/53 |
| 2009/0242287 A1* | 10/2009 | Eritate et al. ............ 180/65.22 |

FOREIGN PATENT DOCUMENTS

| | | |
|---|---|---|
| EP | 1097830 A | 5/2001 |
| FR | 2660040 A | 9/1991 |
| FR | 2783764 A | 3/2000 |
| FR | 2832357 A1 | 5/2003 |

* cited by examiner

SWITCHING DEVICE FOR A MOTOR VEHICLE AND USE OF THIS DEVICE

The present invention concerns a switching device for a motor vehicle and a use of this device. A particular purpose of the invention is to change the vehicle gear ratio or operating mode, or to engage two simultaneous gear ratios. The invention has a particularly useful application in the area of hybrid vehicles, but it could also be used with any other type of land vehicle.

Transmission devices are known for hybrid vehicles having a heat engine, two electric machines and one, two or several planetary gear trains connected to one another within a mechanical assembly. An example of such devices is described in the French patent application FR-A-2832357. With these transmission devices, the power of the heat engine can be transmitted directly to the wheels or split through an electrical system. The electrical system connects the electric machines, which are capable of functioning as a motor or as a generator, depending on levels of electrical and/or mechanical energies received at their terminals and on their shaft, respectively. The split power is retransmitted to the wheels of the vehicle or stored, if applicable, in a storage system. This split power makes it possible to accurately adjust the torque applied to the wheels of the vehicle to match the request of a driver, and at the same time accurately adjust the torque and speed of the heat engine as well, so as to optimize its performance.

In a case where no storage system is connected to the bus, the energy produced by one of the machines is automatically consumed by the other machine. As a variant, a storage system such as a battery is connected to the bus. In a specific battery recharge mode, the two machines can then operate simultaneously as a generator in order to store a maximum of energy in the battery. And in a specific power boost mode, the two machines can function simultaneously as a motor when the heat engine is off.

In the particular case of power splitting transmissions, changing operating modes makes it possible to select the source of power being used. For example, in a given mode, a shaft such as the wheel shaft is connected to a shaft of one of the electric machines, whereas in another mode, this shaft is connected to a shaft of the heat engine.

To this end, when switching from one mode to another, a drive shaft of the device, such as a shaft of one of the power sources, disconnects from a first gear connected to the wheel shaft, for example, and reconnects to a second gear connected to an element of the mechanical assembly, for example.

With a conventional switching device, during a first switching phase, the drive shaft is connected only to the first gear. Then during a second switching phase, the drive shaft is connected neither to the first nor to the second gear. And in a third switching phase, the drive shaft is connected only to the second gear. Consequently, a conventional device has three positions: one of the two gears engaged and no gear engaged.

In power splitting devices, certain modes that are fixed ratios make it possible, as does a conventional gearbox, to match the speed of the heat engine shaft to the speed of the wheel shaft. In order to change from one mode to another, a drive shaft is mechanically linked to or unlinked from an idler gear, as is conventionally done in a gearbox. However, in contrast to a conventional gearbox, in order to obtain the fixed-ratio modes, two ratios are engaged at the same time. Thus, to give an example, in order to engage a fixed ratio, the drive shaft, which is generally the shaft of one of the power sources, is connected to two gears at once. By simultaneously engaging two ratios, it is possible to block one degree of freedom of the mechanical assembly. With the existing systems, it is impossible to simultaneously engage two gear ratios.

An objective of the invention is thus to solve these problems of simultaneously engaging two gear ratios.

To this end, the switching device according to the invention is geometrically configured or is controlled in such a way that it is capable of rotationally connecting the first and the second idler gear with their shaft simultaneously or independently.

More precisely, this switching device includes a dog clutch and two idler gears mounted on the drive shaft. These two idler gears are each connected to a mechanical element to which the drive shaft is connectable. The dog clutch has protrusions and the idler gears have projections. These projections and these protrusions extend axially in relation to the shaft, and are designed to interlock with one another.

In a first embodiment, a one-piece dog clutch is used, embodied as one part. In order to make a simultaneous connection to the two gears during a switching operation, the dog clutch has a length greater than a distance between two gears. This way, it is possible to obtain three positions: one of the two gears engaged and both gears engaged. In this embodiment, in order to avoid jolts, the rotation speeds of the gears and the drive shaft must be synchronized.

In a second embodiment, the dog clutch is in two parts, and these two parts are controlled independently. In this way, it is possible to obtain four positions: one of the two gears engaged, both gears engaged, and neither of the two gears engaged. The additional position in which neither of the two gears is engaged can be used as an intermediate stage during a change of operating mode. Actually, this position makes it possible to effect a change of operating mode even if synchronization conditions are not met. Furthermore, this position makes it possible to have a neutral gear position and to recharge a battery of the vehicle when stopped.

The application example is illustrated with power splitting transmissions. But the invention is usable in any type of transmission device or mechanical system that calls for engaging two gear ratios simultaneously or independently.

The invention thus concerns a switching device for a motor vehicle having two idler gears and a dog clutch,
  this dog clutch being displaced to selectively connect a drive shaft with one of the two idler gears, characterized in that:
  the dog clutch has protrusions in order to be simultaneously connected to the two gears, these protrusions extending parallel to an axis of the shaft,
  the idler gears having projections, these projections extending parallel to the axis of the shaft,
  the protrusions being designed to fit into the spaces between the projections of the gears.

The invention also concerns a use of the switching device according to the invention with a device for transmitting power between an engine shaft and a wheel shaft, this device having:
  at least one electric machine with a machine shaft,
  the engine shaft, the wheel shaft and the machine shaft being connected via a mechanical assembly made up of at least one planetary and/or Ravigneaux-type gear train,
  the switching device being mounted on one of the shafts in order to connect this shaft either with an element of the mechanical assembly or with another element of the assembly, or with both elements simultaneously.

Figure 2:
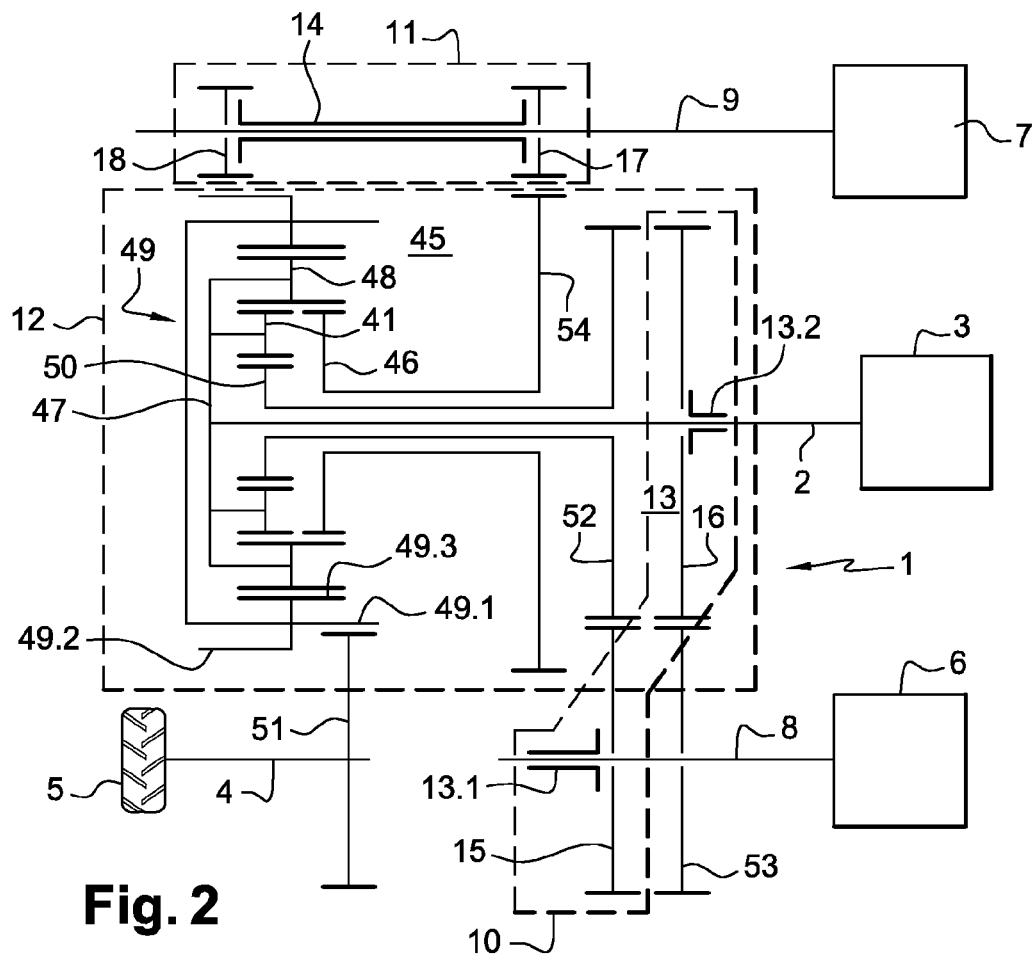
Figure 3:
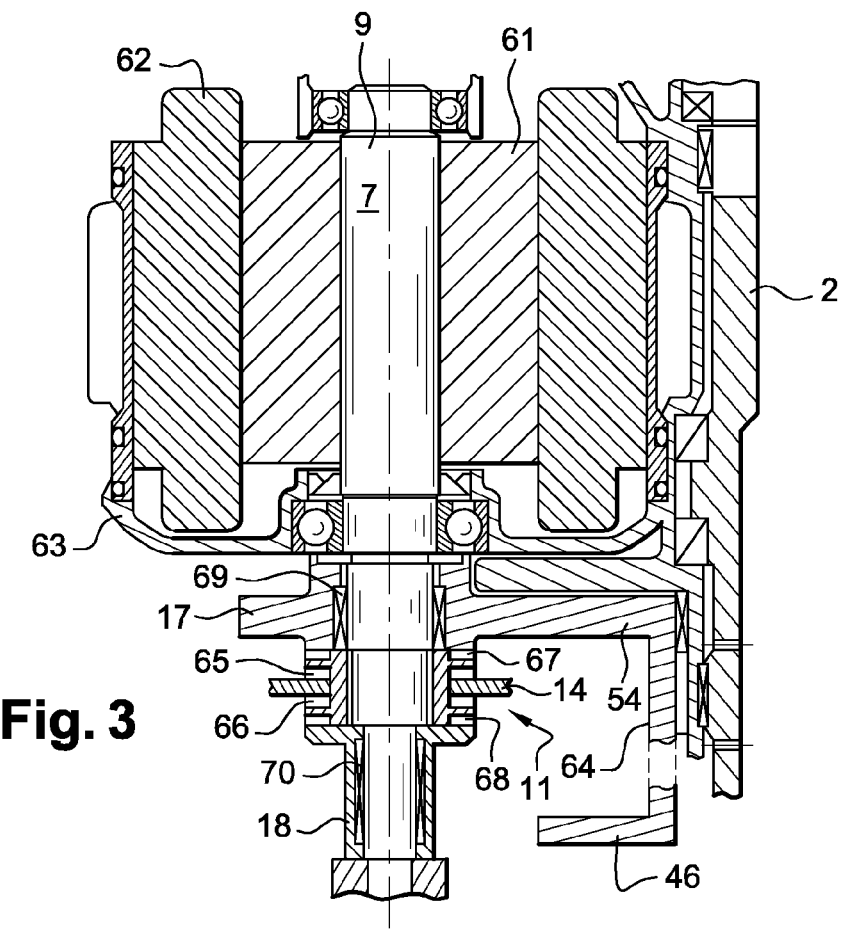
Figure 4A:
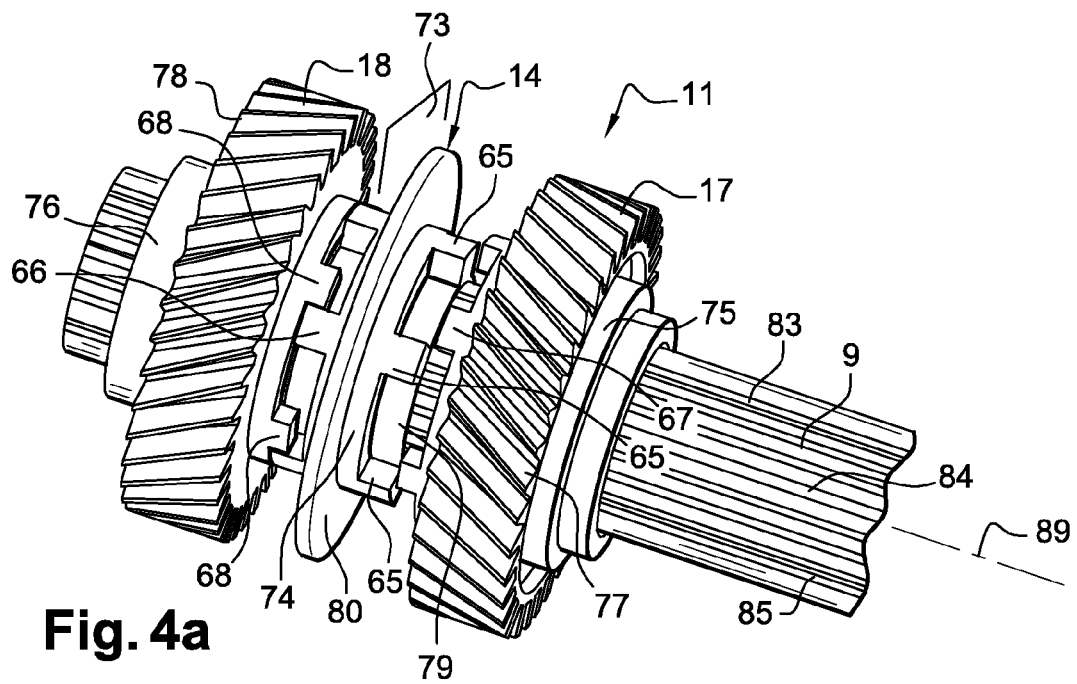
Figure 4B:
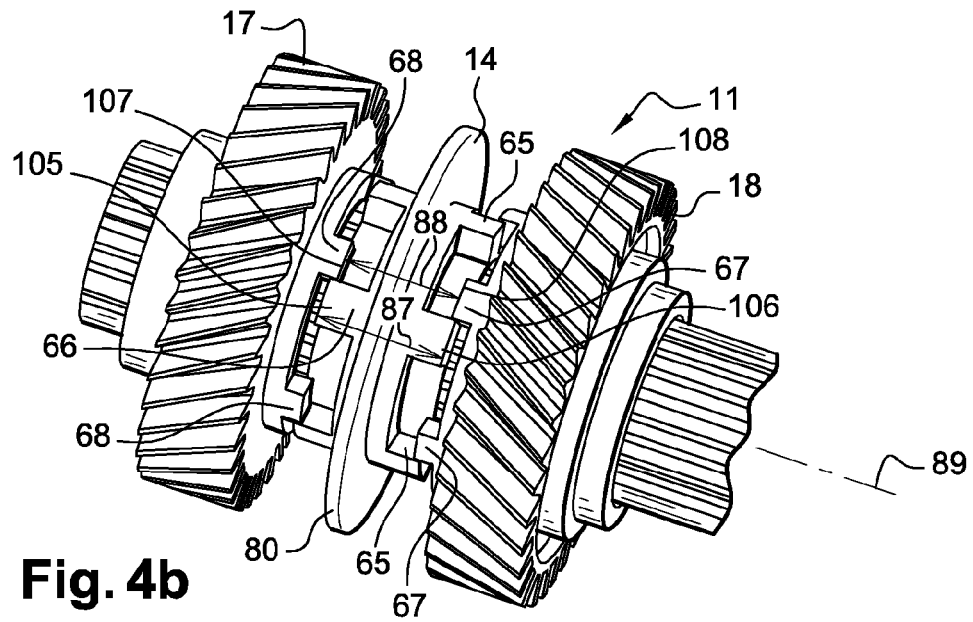
Figure 5A:
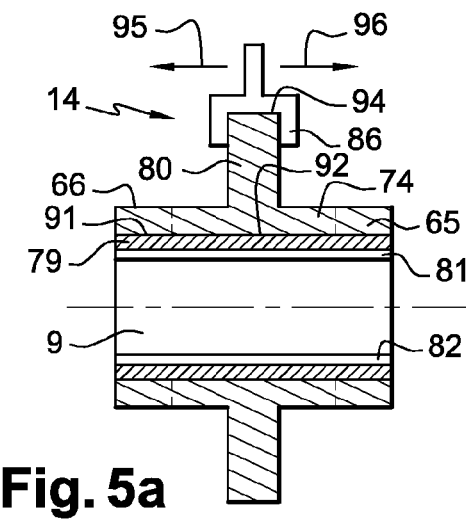
Figure 5B:
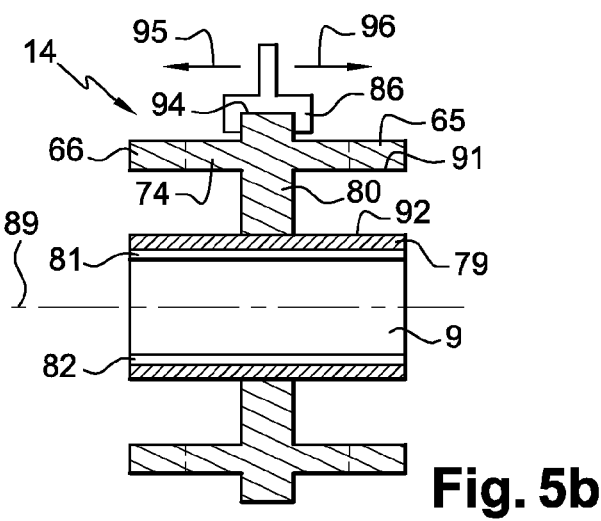
Figure 5C:
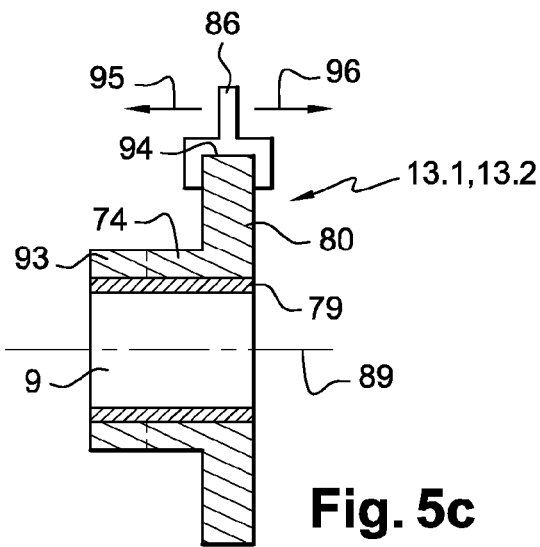
Figure 6A:
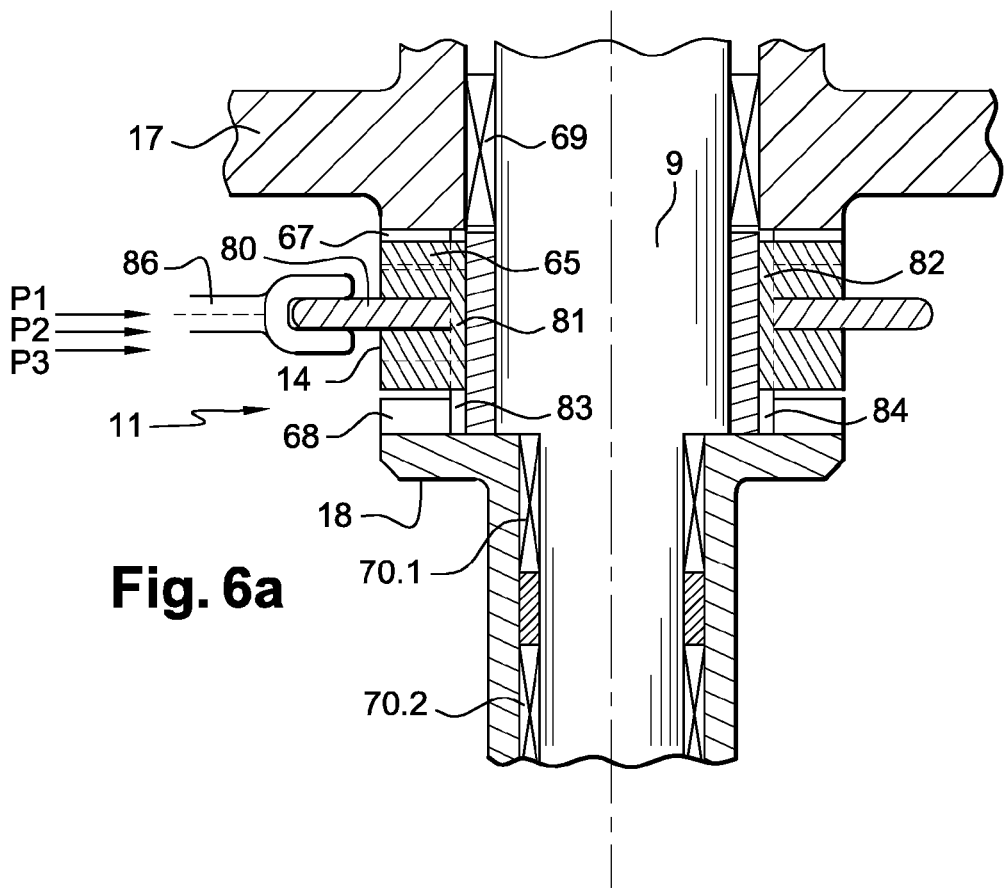
Figure 6B:
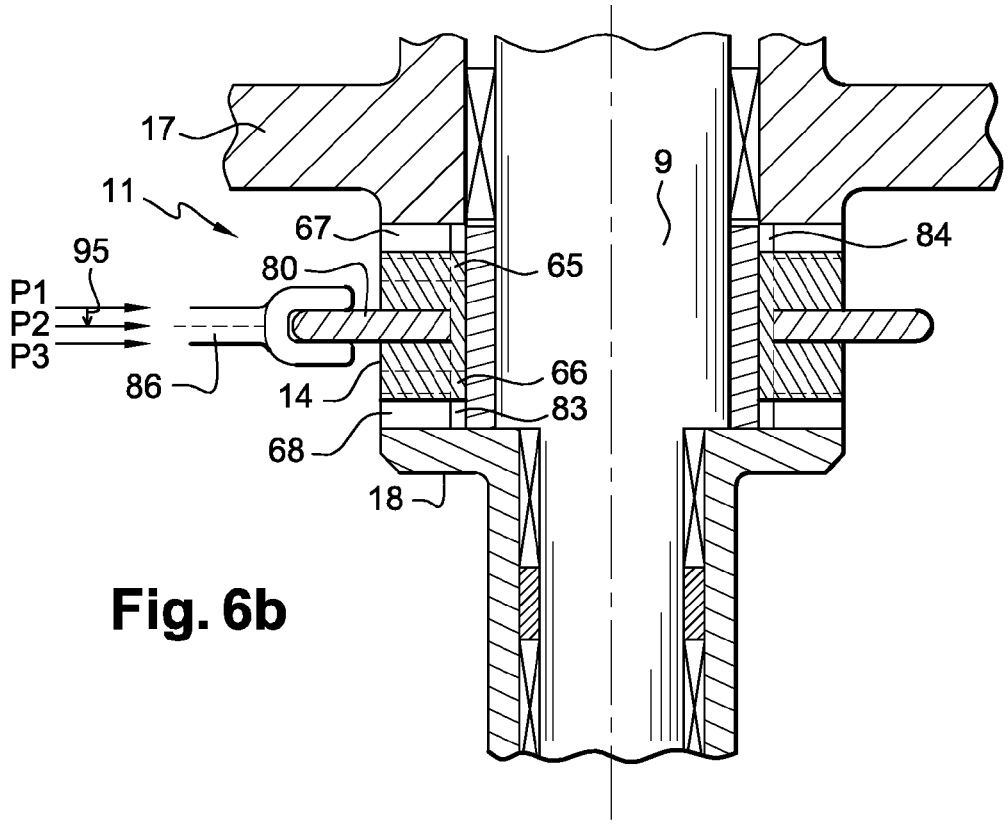
Figure 6C:
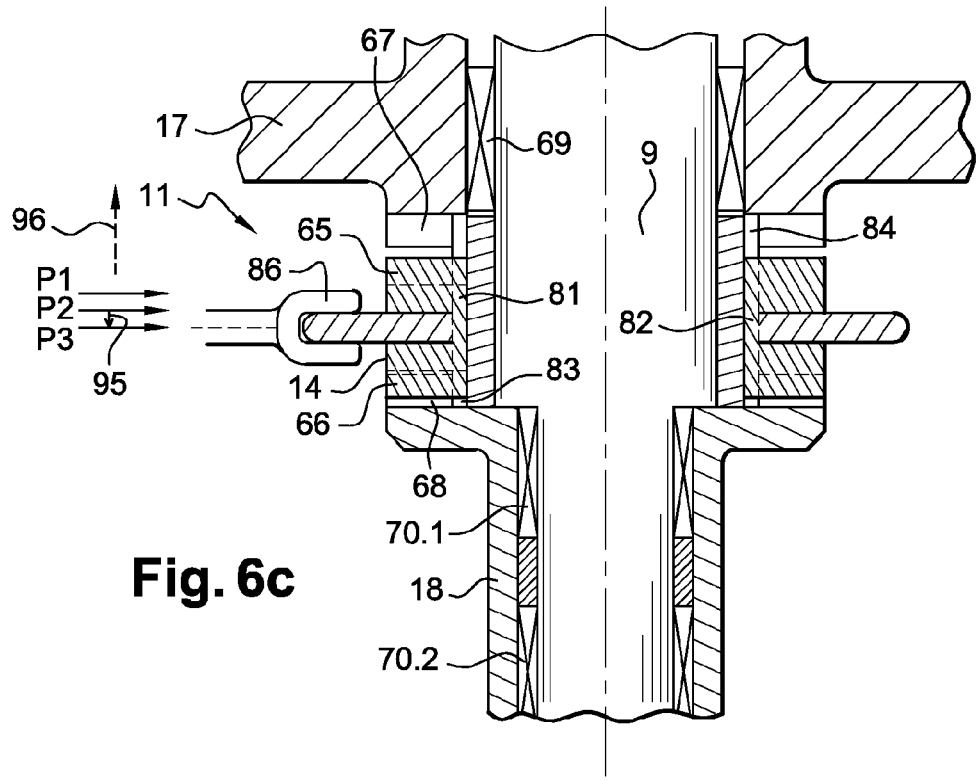
Figure 7:
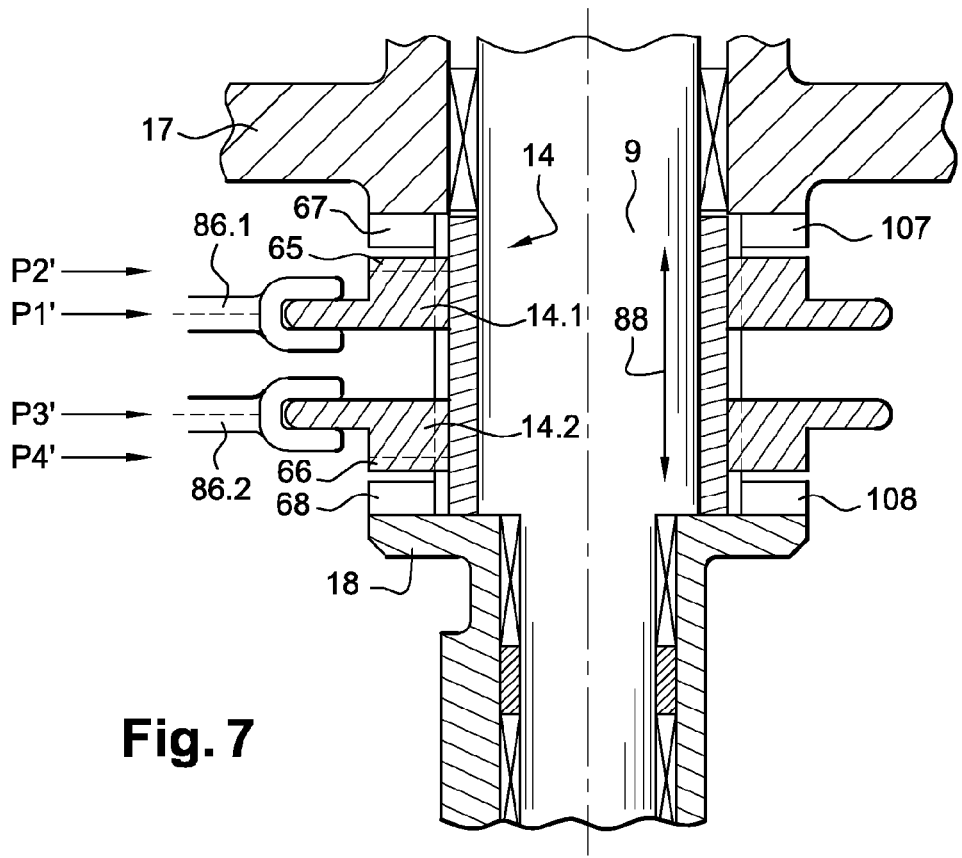
Figure 8:
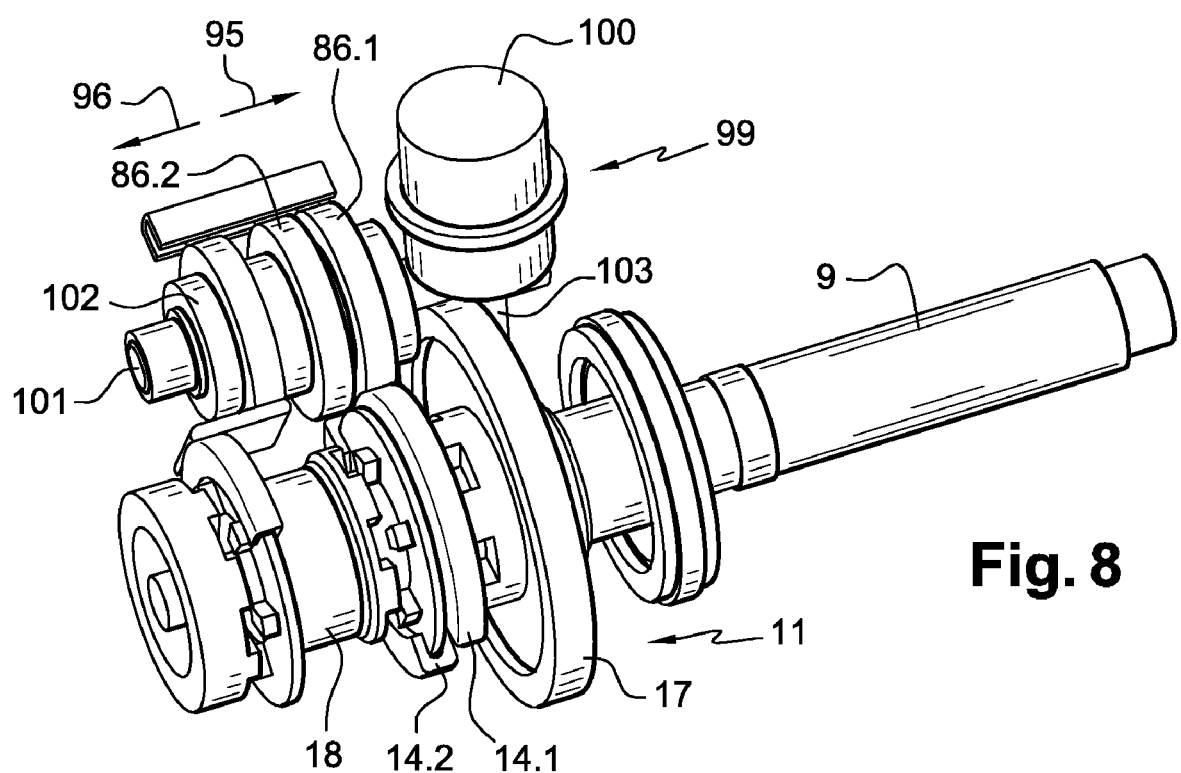

The following description and accompanying figures will make the invention more easily understood. These figures are given as an illustration, and are in no way an exhaustive representation of the invention. These figures show:

FIG. 1: A schematic representation of a transmission device that has switching devices according to the invention;

FIG. 2: A schematic representation of a transmission device with a Ravigneaux gear train including transmission devices according to the invention;

FIG. 3: A cross-section view of a switching device according to the invention mounted on a shaft of an electric machine;

FIGS. 4a and 4b: Three-dimensional views of a switching device according to the invention;

FIGS. 5a, 5b and 5c: Sectional views of alternative embodiments of a dog clutch according to the invention;

FIGS. 6a, 6b and 6c: Schematic representations of stages of a switching operation performed with a switching device according to the invention;

FIG. 7: A cross-section view of an alternative embodiment of the switching device according to the invention;

FIG. 8: A three-dimensional view of a layout of a switching device according to the invention.

FIG. 1 shows a device 1 for power transmission between a shaft 2 of a heat engine 3 and a shaft 4 of wheels 5 of a vehicle. This device 1 includes two electric machines 6 and 7 that have a shaft 8 and 9, respectively. On these shafts 8 and 9 a switching device 10 and 11 according to the invention is mounted.

More precisely, the shafts 2, 4, 8 and 9 are connected to one another through a mechanical assembly 12. This assembly 12 generally has two or more planetary gear trains. Each gear train has three elements: a sun gear, a planet gear and a ring gear that intermesh with one another. The gear trains of the assembly 12 are connected to one another in such a way that they offer two degrees of freedom and four rotationally mobile elements to which the shafts 2, 4, 8 and 9 are connected.

The switching devices 10 and 11 according to the invention each have a dog clutch 13, 14 and two idler gears 15, 16 or 17, 18. The dog clutches 13 and 14 are rotationally driven by the shaft 8 or 9 to which they are coupled. These dog clutches 13 and 14 are coupled either to one or the other of the gears, or to both gears at once. When a dog clutch is coupled to a gear, this dog clutch drives the gear rotationally. When a gear is not connected to a dog clutch, this gear spins freely on the shaft.

Consequently, the shaft 8 is connectable either to a first element 19 of the assembly 12 or to a second element 20 of the assembly 12, or to both elements 19 and 20 simultaneously. When the shaft 8 is connected to the first element 19, the dog clutch 13 is engaged with the gear 16, whereas the gear 15 spins freely on the shaft 8. When the shaft 8 is connected to the second element 20, the dog clutch 13 is engaged with the gear 15, whereas the gear 16 spins freely on the shaft 8. When the shaft 8 is connected to the first and the second elements at the same time, the dog clutch 13 is simultaneously engaged with the gear 15 and the gear 16.

Similarly, the shaft 9 is connectable either to a third element 21 of the assembly 12 or to a fourth element 22 of the assembly 12, or to both elements 21 and 22 simultaneously. When the shaft 9 is connected to the third element 21, the dog clutch 14 is engaged with the gear 18, whereas the gear 17 spins freely on the shaft 9. When the shaft 9 is connected to the fourth element 22, the dog clutch 14 is engaged with the gear 17, whereas the gear 18 spins freely on the shaft 9. When the shaft 9 is connected to the third and the fourth elements 21, 22 at the same time, the dog clutch 14 is engaged simultaneously with the gear 17 and the gear 18.

The elements 19-22 can correspond to a sun gear, a planet carrier or a ring gear of one of the gear trains of the assembly 12, or to shafts of the assembly 12 or of the device 1. In a particular embodiment, the first element 19 corresponds to the shaft 2 of the engine 3 and the third element 21 corresponds to the shaft 4 of wheels 5.

Furthermore, the machines 6 and 7 are connected to one another through an electrical system 23. This system 23 includes two inverters 24 and 25, as well as an electrical bus 26 with two connections 30 and 31. More precisely, phases 27-29 of the first machine 6 are linked to the inverter 24, which is in turn linked to the connections of the bus 26 via two cable linkages 32 and 33. Phases 34-36 of the second machine 7 are linked to the inverter 25, which is in turn linked to the bus 26 via two cable linkages 37 and 38.

When one of the machines 6 or 7 is operating as a generator, AC voltage signals detectable between its phases 27-29 or 34-36 are transformed by the inverter 24 or 25 associated with this machine into a DC voltage signal detectable on the bus 26. When one of the electric machines 6 or 7 is operating as a motor, a DC voltage signal detectable on the bus 26 is transformed into AC voltage signals by the inverter 24 or 25 associated with this machine. These voltage signals are applied to the phases of the machine that is operating as a motor.

In general, during a switching operation, one of the machines is stopped so that the power dissipated in the electrical system is almost zero. The dog clutch can then move unhindered along the shaft of the other machine, since the detectable torque on this shaft is zero.

A storage device 39, such as a battery or a supercapacitor, can be connected to the bus 26.

FIG. 2 shows a schematic representation of a transmission device 1 that has a mechanical assembly 12 made up of a Ravigneaux-type gear train 45 and switching devices according to the invention. For greater simplicity, the electrical system connecting the electric machines 6 and 7 to one another is not shown.

More precisely, the gear train 45 provides four mobile elements to which the shafts of the device 1 are connected. Like a planetary gear train, this gear train 45 includes a first sun gear 46, a planet carrier 47 carrying a first set of planets 48 and a ring gear 49 that mesh with one another. In addition, the gear train 45 includes a second set of planets 41 and a second sun gear 50. This second set of planets 41 is carried by the planet carrier 47 and meshes simultaneously with the first set of planets 48 and with the second sun gear 50.

In this embodiment, the shaft 2 is connected to the planet carrier 47. And the shaft 4 of wheels 5 is connected to the ring gear 49 via a wheel 51. For this purpose, the ring gear 49 bears two sets of outer teeth 49.1 and 49.2 and an inner set 49.3.

The shaft 8 is connectable either to the second sun gear 50 or to the shaft 2 of the engine, or to both. To this end, the first switching device 10 has a dog clutch 13 in two parts 13.1 and 13.2. The first part 13.1 is connected to the shaft 8 of the first machine 6, while the second part 13.2 is connected to the shaft 2 of the engine 3. This device 10 also includes the idler gear 15 and the idler gear 16, mounted to the shaft 8 and the shaft 2, respectively.

When the shaft 8 is connected to the second sun gear 50, the first part 13.1 of the dog clutch interlocks with the gear 15, whereas the gear 16 spins freely on the shaft 2. Thus, the shaft 8 is connected to the second sun gear 50 via a gear assembly made up of a gear 15 and a wheel 52 coupled to the second sun gear 50. When the shaft 8 is connected to the shaft 2, the second part 13.2 of the dog clutch interlocks with the idler gear 16, whereas the idler gear 15 spins freely on the shaft 8. In this case, the shaft 8 is connected to the shaft 2 via a gear assembly made up of the gear 16 and a wheel 53 directly coupled to the shaft 8.

When the shaft 8 decouples from the sun gear 50 to couple to the shaft 2 or vice versa, it is preferable to zero out the torque on the shaft 8 by zeroing out the rotation speed of the shaft 9.

As a variant, both parts 13.1 and 13.2 and the gears 15 and 16 of the switching device 10 are mounted on the shaft 8.

In addition, the shaft 9 of the second machine 7 is connectable either to the shaft 4 of wheels 5 or to the first sun ring 46, or to both. For this purpose, the second switching device 11 includes the gear 17 and the gear 18 and a one-piece dog clutch 14, which are mounted on the shaft 9.

When the shaft 9 is connected to the shaft 4, the dog clutch 14 is engaged with the gear 18 and disengaged from the gear 17. This way, the shaft 9 is connected to the shaft 4 via the gear 18, the ring gear 49 and the wheel 51 coupled to the shaft 4. When the shaft 9 is connected to the first sun gear 46, the dog clutch 14 is engaged with the gear 17 and disengaged from the gear 18. This way, the shaft 9 is connected to the sun gear 46 via a gear assembly made up of the gear 17 and the wheel 54 coupled to the sun gear 46.

When the shaft 9 decouples from the shaft 4 of wheels 5 to couple to the first sun gear 46 or vice versa, the rotation speed of the shaft 9 is equal to the rotation speed of the gear 17 and the gear 18. Here again, during this switching operation, it is preferable to zero out the detectable torque on the shaft 9 by zeroing out the rotation speed of the shaft 8.

As a variant, the dog clutch 14 is made up of two independent parts like the dog clutch 13, mounted on the shaft 9. In this variant, when the shafts 8 and 9 are not coupled to a gear, the two machines can operate as a generator and recharge a battery while the vehicle is stopped.

The transmission device 1 is operable in three operating modes. In a first operating mode, the shaft 8 is connected to the second sun gear 50, while the shaft 9 is connected to the shaft 4 of wheels 5. This first operating mode is used particularly when starting the vehicle from a stop, and in reverse.

In a second operating mode, the shaft 8 is connected to the second sun gear 50, while the shaft 9 is connected to the first sun gear 46. This second operating mode is generally used for midrange transmission ratios, higher than those of the first mode, but lower than those of a third mode.

In the third operating mode, the shaft 8 is connected to the shaft 2 of the engine 3, while the shaft 9 is connected to the first sun gear 46. This third operating mode is generally used for higher transmission ratios than those used in the second mode.

In each mode, the machines 6 and 7 are capable of operating either as a motor or as a generator.

FIG. 3 shows a sectional view of the switching device 11 according to the invention. As previously mentioned, the switching device 11 is coupled to the shaft 9 of the electric machine 7. This device 11 includes a dog clutch 14 positioned between the gear 17 and the gear 18. This gear 17 and this gear 18 are mounted on the shaft 9 via a bearing 69 and 70, respectively.

More precisely, the machine 7 has a rotor 61 coupled to the shaft 9, as well as a stator ring 62 that is stationary and coupled to a housing 63. The dog clutch 14 is rotationally driven by the shaft 9, and is translationally mobile along the shaft 9. The dog clutch 14 is thus capable of connecting the shaft 9 to either gear 17 or 18, or to both gears 17 and 18 at the same time.

For this purpose, the dog clutch 14 has protrusions 65 and 66 on two faces opposite one another and perpendicular to the shaft 9. These protrusions 65 and 66 are capable of interlocking with projections 67 and 68 of the gears 17 and 18. These protrusions 65, 66 and these projections 67, 68 are oriented axially to the shaft 9.

In a particular embodiment, the gear 17 meshes with the wheel 54 that is connected to the first sun gear 46 via a shaft 64. This shaft 64 is hollow and encloses the shaft 2, only one-half of which is shown. The gear 18 meshes with the ring gear 49 (not shown).

FIG. 4 show three-dimensional views of the switching device 11 according to the invention, mounted on the shaft 9. FIG. 4a shows a view in which the one-piece dog clutch 14 interlocks with the gear 18. FIG. 4b shows a view in which the dog clutch 14 interlocks with both gears 17 and 18 at the same time.

View 4a illustrates the fact that the protrusions 65 and 66 of the dog clutch 14 extend parallel to an axis 89 of the shaft 9. The projections 67 and 68 of the gears 17 and 18 also extend parallel to the shaft 9, and are oriented axially with respect to the axis 89 of the shaft 9. The protrusions 65, 66 and the projections 67 and 68 point toward one another. Here, the protrusions 66 located on the face of the dog clutch 14 that faces the gear 18 interlock with the projections 68 of this gear 18. Actually, the protrusions 66 fit inside the spaces separating two successive projections, so that one of the faces of each protrusion is up against one of the faces of each projection when the shaft 9 is rotating.

More precisely, the dog clutch 14 has a ring 74. The protrusions 65 and 66 are arranged around this ring 74 on two opposite faces of this ring 74 perpendicular to the shaft 9. Furthermore, the gears 17 and 18 each have an annular core 75 and 76 to which a ring gear 77 and 78 is coupled. An inner periphery of the ring gears 77 and 78 is coupled to an outer periphery of the cores 75 and 76. The projections 67 are arranged around the core 75 of the gear 17 on a face of this core 75 perpendicular to the shaft 9. In practice, the ring 74, the cores 75 and 76 and the shaft 9 are concentric.

The dog clutch 14 further includes an annular hub 79. This hub 79 has splines (references 81 and 82 on FIG. 5) that extend radially in relation to the shaft 9 and have an extension along this shaft 9. These splines 81 and 82 interlock with grooves 83-85 set into a periphery of the shaft 9. These grooves 83-85 each have an indentation that extends radially and has an extension along the shaft 9. In a particular embodiment, the splines 81, 82 and the grooves 83-85 are fitted to one another. Thus, the dog clutch 14 can be driven rotationally by the drive shaft 9, while simultaneously being allowed to move translationally along this shaft 9.

In a particular embodiment, the grooves 83-85 are located on the shaft 9 between the outermost faces of the gear 17 and the gear 18, which are perpendicular to the shaft 9. The grooves 83-85 are at least as long as the distance over which the dog clutch 14 is capable of traveling.

As a variant, the shaft 9 has splines that interlock with grooves set into the hub 79. The splines and the grooves are usually spaced evenly around the shaft 9.

Furthermore, the dog clutch 14 has a ring-shaped ridge 80 that extends radially relative to the shaft 9. This ridge 80 is coupled to an outer periphery of the ring 74. This ridge 80 is designed to be connected to a fork (reference 86 on FIG. 5) that is capable of displacing the dog clutch 14 along the shaft 9.

FIG. 4b shows a three-dimensional view of the switching device 11 according to the invention when the dog clutch 14 interlocks simultaneously with the gear 17 and the gear 18. That is, on this figure, the protrusions 65 are engaged inside the spaces between the projections 67. And the protrusions 66 are engaged inside the spaces between the projections 68.

For this purpose, a first distance 87 measured along an axis 89 of the shaft 9 between two longitudinal ends 105 and 106 of the protrusions of the dog clutch 14 is greater than a second distance 88 measured along the axis 89 of the shaft 9 between two longitudinal ends 107, 108 of the projections 67 and 68 of the two gears 17 and 18. These longitudinal ends are orthogonal to the axis 89.

Furthermore, the protrusions 65 and 66 and the projections 67 and 68 are fitted to one another. Thus, when they interlock, each protrusion 65, 66 is in contact with its corresponding projection 67, 68 over the largest possible surface. In a particular embodiment, the protrusions 65 and 66 and the projections 67 and 68 have a trapezoid shape. However, as a variant, these protrusions and these projections could have a crenellated or sawtooth shape.

In practice, the protrusions 65 and 66 and the projections 67 and 68 are evenly spaced around the shaft 9. Thus, an angle between two successive protrusions 65, 66 is the same as that between two successive projections 67, 68. This identical angle allows all of the protrusions to be facing a projection.

FIG. 5 show alternative embodiments of the dog clutch 13 or 14 according to the invention. The ring 74 carries axial protrusions 65 and 66.

In FIG. 5a, the ring 74 is coupled to the hub 79 and to the ridge 80. An inner periphery 91 of the ring 74 is coincident with an outer periphery 92 of the hub 79. This way, the ring 74 and the protrusions 65, 66 are generally close to a periphery of the shaft 9. In a particular embodiment, a difference between the diameter of the ring 74 and the diameter of the shaft 9 is less than 5% of the diameter of the shaft.

In the variant represented in FIG. 5b, the inner periphery 91 of the ring 74 is away from the outer periphery 92 of the hub 79. In this variant, the ring 74 extends axially with respect to the shaft 9 on both sides of the ridge 80, in between the inner circular periphery and the outer circular periphery of this ridge 80. The ridge 80 is then directly connected to an outer periphery of the hub 79. Consequently, the protrusions 65, 66 are separated from the axis 89 of the shaft 9 by a distance greater than the radius of this shaft 9.

The further the protrusions 65, 66 are from the shaft 9, the greater the detectable torque is at a contact between the protrusions 65, 66 and the projections 67, 68. Therefore, the further the protrusions 65, 66 are from the shaft 9, the easier it is to transmit a torque between the dog clutch 14 and a gear.

FIG. 5c shows a part 13.1 or 13.2 of the dog clutch 13 in FIG. 2. This part 13.1 or 13.2 in fact corresponds to one-half of the dog clutch 13 or 14. The protrusions 93 are designed to interlock only with projections of one of the gears 17 or 18.

The dog clutches 13 and 14 in FIG. 5 are connected to the fork 86. This fork 86 has a circular groove 94 within which the ridge 80 of the dog clutch is positioned. This fork 86 rests on a rim of the ridge 80. This fork 86 is designed to move the dog clutch 14 translationally along the shaft 9 in both directions 95 and 96.

In practice, the hub 79, the ring 74, the protrusions 65, 66 and the ridge 80 of the dog clutch 14 are molded or welded together.

As a variant, the dog clutch 14 does not have a ring 74. An inner periphery of the ridge 80 is then coupled to an outer periphery of the hub 79. The protrusions are then coupled directly to a side of the ridge. And the protrusions 65, 66 extend to either side of the ridge 80, or to just one side in the case of a two-part dog clutch. This embodiment allows the dog clutch to be made more compact by shortening its axial length.

FIGS. 6a-6c show the stages of a switching operation performed with the switching device 11 according to the invention.

In a first stage represented in FIG. 6a, the dog clutch 14 is in a position P1. In this position P1, the dog clutch 14 is engaged with the gear 17, whereas it is disengaged from the gear 18. Thus, only the protrusions 65 of the dog clutch 14 interlock with the projections 67 of the gear 17. The shaft 9 is then rotationally connected to the gear 17. The gear 18 spins freely on the shaft via bearings 70.1 and 70.2.

In a second stage represented in FIG. 6b, the dog clutch 14 is translationally displaced along the shaft 9 in the direction 95. This displacement moves the dog clutch 14 to a position P2. In this position P2, the dog clutch 14 is engaged simultaneously with the gear 17 and the gear 18. Thus, the protrusions 65 and 66 of the dog clutch 14 interlock with the projections 67 and 68, respectively. The shaft 9 is then rotationally connected with both gears 17 and 18. Two gear ratios are then engaged simultaneously. In addition, during this second stage, the dog clutch 14 can be moved the distance of the clearances between the dog clutch 14 and the gears 17 and 18, in order to transfer the support of the dog clutch 14 from the gear 17 toward the gear 18.

In a third stage represented in FIG. 6c, the dog clutch 14 is again displaced along the shaft 9 in the direction 95. This displacement moves the dog clutch 14 to a position P3. In this position P3, the dog clutch 14 is engaged with the gear 18, whereas it is disengaged from the gear 17. Thus, only the protrusions 66 of the dog clutch 14 interlock with the projections 68 of the gear 18. The shaft 9 is then rotationally connected only with the gear 18. The gear 17 then spins freely on the shaft 9 via a bearing 69.

During the switching operation, the rotation speeds of the shaft 9 and the gears 17 and 18 are equal, in order to reduce jolting. And the detectable torque on the shaft 9 is zero.

In general, during a switching operation, the dog clutch 14 is displaced continuously, that is, at a constant speed and without stopping. Conversely, of course, the dog clutch 14 can decouple from the gear 18 to couple with the gear 17.

Furthermore, when the dog clutch 14 is traveling along the shaft 9, the splines 81, 82 on the inner periphery of the dog clutch 14 slide inside the grooves 83, 84 running along the shaft 9.

FIG. 7 shows an alternative embodiment of the dog clutch 14. Like the dog clutch 13 in FIG. 2, this dog clutch 14 has a first 14.1 and a second 14.2 part. These parts 14.1 and 14.2 bear the protrusions 65 and 66, respectively. These parts 14.1 and 14.2 are separate and move independently of one another. These parts 14.1, 14.2 are capable of moving over a distance greater than the distance 88 measured along the axis of the shaft 9 between two longitudinal ends 107, 108 of the projections of the two gears 17, 18.

The first part 14.1 is capable of occupying either a disengaged position P1' or an engaged position P2'. In the disengaged position P1', the protrusions 65 of the part 14.1 do not interlock with the projections 67 of the gear 17. In the engaged position P2', the protrusions 65 of the part 14.1 interlock with the projections 67 of the gear 17.

The second part 14.2 is capable of occupying either a disengaged position P3' or an engaged position P4'. In the disengaged position P3', the protrusions 66 of the part 14.2 do not interlock with the projections 68 of the gear 18. In the engaged position P4', the protrusions 66 of the part 14.2 interlock with the projections 68 of the gear 18.

Thus, the first stage in FIG. 6a is equivalent to a stage in which the part 14.1 is in position P2', while the part 14.2 is in position P3'. The second stage in FIG. 6b is equivalent to a stage in which the part 14.1 is in position P2', while the part 14.2 is in position P4'. The third stage in FIG. 6c is equivalent to a stage in which the part 14.1 is in position P1', while the part 14.2 is in position P4'.

Furthermore, when the two parts 14.1, 14.2 are in a disengaged position, it is possible to have the shaft 9 connected to neither of the gears 17 or 18. This configuration makes it possible to change operating modes when the two gears have different rotation speeds. Thus, by replacing the stage where the shaft 9 is simultaneously connected to both gears 17 and 18 with a stage where the shaft 9 is not connected to either gear, it is possible to adjust the speed of the shaft 9 so that one of the parts 14.1 or 14.2 attains the rotation speed of the gear to which it is going to be connected.

The dog clutches 14.1 and 14.2 are displaced using a fork 86.1 and 86.2, respectively. Each fork 86.1 and 86.2 moves independently of the other via a direct current motor.

FIG. 8 shows an example of a spatial layout of the switching device 11 according to the invention. In this FIG. 8, the gears 17 and 18, as well as the dog clutch 14 in two parts 14.1 and 14.2, are mounted on the shaft 9.

More precisely, the switching device 11 has a motor assembly 99 including an electric motor 100, an endless screw 101 and a barrel 102 having several independently movable parts. This barrel 102, which has internal threads, is mounted to the threaded screw of the assembly 99. The fork 86.1 is simultaneously coupled to the part 14.1 and to the barrel 102. The fork 86.2 is simultaneously coupled to the part 14.2 and to the barrel 102.

When the motor 100 turns, it drives the rotation of the screw 101. The rotation of this screw serves to drive the barrel 102 translationally, and thus the fork 86.1 or 86.2. The fork 86.1 or 86.2 is capable of translationally moving the part 14.1 or 14.2 in the direction 95 or the direction 96. The direction of translation depends on the direction the screw 101 is rotating.

In a particular embodiment, a shaft 103 of the motor 100 is orthogonal to the shaft 9, and the screw 101 is parallel to the shaft 9. As a variant, the shaft 103 is oriented parallel to the shaft 9 and/or the screw of the system 101 is oriented orthogonally to the shaft 9.

The invention claimed is:

1. A device for power transmission between a shaft of a heat engine and a shaft of wheels, this device having at least one electric machine that has a machine shaft,
   the shaft of the engine, the shaft of wheels and the machine shaft being connected through a mechanical assembly,
   this transmission device further having a switching device that includes a dog clutch, as well as a first and a second gear connected to the mechanical assembly,
   the dog clutch being capable of being displaced to selectively connect a first shaft among the shaft of the engine, the shaft of wheels and the machine shaft, with one of the first and second gears,
   the dog clutch having protrusions extending parallel to an axis of the first shaft,
   the gears having projections, these projections extending parallel to the axis of the first shaft,
   the protrusions of the dog clutch being designed to fit into the spaces between the projections of the gears,
   the dog clutch and the gears being such that they allow the dog clutch to engage simultaneously with both the first and second gears, the protrusions of the dog clutch being able to fit simultaneously into the spaces between the projections of the first gear and into the spaces between the projections of the second gear, such that two gear ratios of the transmission device can be engaged simultaneously,
   wherein said device comprises means to zero out the torque of a dog shaft carrying the dog clutch when the two gear ratios are engaged simultaneously.

2. The device according to claim 1, wherein:
   the dog clutch is of one piece, a first distance measured along the axis of the first shaft between two longitudinal ends of the protrusions being greater than a second distance measured along the axis of the first shaft between two longitudinal ends of the projections of the two gears.

3. The device according to claim 1, wherein:
   the dog clutch is in two parts, each of the parts being capable of being moved independently of the other.

4. The device according to claim 3, wherein:
   the parts are capable of moving over a distance greater than a distance measured along the axis of the first shaft between two longitudinal ends of the projections of the two gears.

5. The device according to claim 1, wherein:
   the projections and the protrusions are evenly spaced around the first shaft.

6. The device according to claim 1, wherein:
   the protrusions and the projections have a complementary trapezoidal shape.

7. The device according to claim 1, wherein:
   the dog clutch has an annular hub, this hub having splines, these splines extending radially with respect to the first shaft and having an extension along this first shaft, these splines interlocking with grooves running along a periphery of the shaft, these grooves each having an indentation, this indentation extending radially and having an extension along the first shaft.

8. The device according to claim 7, wherein:
   the dog clutch has a ring-shaped ridge that extends radially with respect to the drive shaft, this ridge being coupled to an outer periphery of the hub, and
   the device comprises a fork designed to move the dog clutch translationally, this fork having an at least partly circular groove within which the ridge is positioned.

9. The device according to claim 8, wherein:
   the protrusions are coupled to the ridge.

10. The device according to claim 8, wherein:
    the fork is mounted on a barrel having threads, this barrel being in turn mounted on a threaded endless screw rotationally driven by a direct current motor.

11. The device according to claim 1, wherein:
    the protrusions are separated from the axis of the first shaft by a distance greater than a radius of this first shaft.

12. The device according to claim 1, wherein:
    the mechanical assembly is made up of at least one planetary and/or Ravigneaux-type gear train,
    the switching device being capable of selectively connecting a shaft of the transmission device to either a first element of this gear train or a second element of this gear train, or to both elements simultaneously.

\* \* \* \* \*